(12) United States Patent
Tamura et al.

(10) Patent No.: US 11,566,696 B2
(45) Date of Patent: Jan. 31, 2023

(54) GEAR DEVICE

(71) Applicant: SUMITOMO HEAVY INDUSTRIES, LTD., Tokyo (JP)

(72) Inventors: Mitsuhiro Tamura, Kanagawa (JP); Toshiaki Matoba, Osaka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 126 days.

(21) Appl. No.: 17/341,753

(22) Filed: Jun. 8, 2021

(65) Prior Publication Data

US 2021/0381589 A1    Dec. 9, 2021

(30) Foreign Application Priority Data

Jun. 9, 2020  (JP) .............................. JP2020-099738

(51) Int. Cl.
| | |
|---|---|
| *F16H 49/00* | (2006.01) |
| *F16H 57/04* | (2010.01) |
| *F16H 55/06* | (2006.01) |
| *B25J 9/10*  | (2006.01) |

(52) U.S. Cl.
CPC ........... *F16H 49/001* (2013.01); *F16H 55/06* (2013.01); *F16H 57/0412* (2013.01); *B25J 9/1025* (2013.01)

(58) Field of Classification Search
CPC .... F16H 49/001; F16H 55/06; F16H 57/0412; B25J 9/1025
See application file for complete search history.

(56) References Cited

U.S. PATENT DOCUMENTS

| | | | |
|---|---|---|---|
| 2018/0266533 A1* | 9/2018 | Tamura | F16H 49/001 |
| 2020/0025277 A1* | 1/2020 | Tamura | F16H 1/32 |
| 2020/0072318 A1* | 3/2020 | Shirouzu | F16H 57/08 |
| 2020/0325976 A1* | 10/2020 | Tamura | F16H 57/023 |
| 2021/0354348 A1* | 11/2021 | Tamura | F16H 49/001 |
| 2021/0396304 A1* | 12/2021 | Yamamoto | F16H 1/32 |

FOREIGN PATENT DOCUMENTS

JP    2018-155313 A    10/2018

* cited by examiner

*Primary Examiner* — Terence Boes
(74) *Attorney, Agent, or Firm* — Michael Best & Friedrich LLP

(57) ABSTRACT

A gear device includes a first gear, and a second gear meshing with the first gear. At least the first gear is made of a resin. The gear device further includes a connection member connected to an external member, a path member disposed in a path leading to the first gear and the connection member, and other members that are members other than the first gear, the second gear, the connection member, and the path member, and are made of a resin. The first gear, the connection member, and the path member are made of a resin having a higher thermal conductivity than a thermal conductivity of the other members.

19 Claims, 2 Drawing Sheets

GEAR DEVICE

RELATED APPLICATIONS

The content of Japanese Patent Application No. 2020-099738, on the basis of which priority benefits are claimed in an accompanying application data sheet, is in its entirety incorporated herein by reference.

BACKGROUND

Technical Field

Certain embodiments of the present invention relate to a gear device.

Description of Related Art

In recent years, it has been proposed for a gear device to use a gear made of resin due to a demand for weight reduction.

However, when resin is used for the gear, the gear is affected by thermal degradation or thermal deformation caused by heat generation at the meshing location of the gear, which is a concern.

Therefore, in the gear device of the related art, one gear of gears meshing with each other is made of a resin material, and the other gear is made of a material having a higher thermal conductivity than that of the gear made of resin, thereby diffusing heat to suppress a rise in temperature (for example, refer to the related art).

SUMMARY

According to an embodiment of the present invention, there is provided a gear device including a first gear, and a second gear meshing with the first gear.

At least the first gear is made of a resin.

The gear device further includes a connection member connected to an external member, a path member disposed in a path leading to the first gear and the connection member, and other members that are members other than the first gear, the second gear, the connection member, and the path member, and are made of a resin.

The first gear, the connection member, and the path member are made of a resin having a higher thermal conductivity than a thermal conductivity of the other members.

DETAILED DESCRIPTION

However, in the gear device of the related art, there is room for improvement in heat dissipation from a side of the gear made of resin.

It is desirable to efficiently suppress a rise in temperature of a gear device.

One Embodiment

Figure 1:
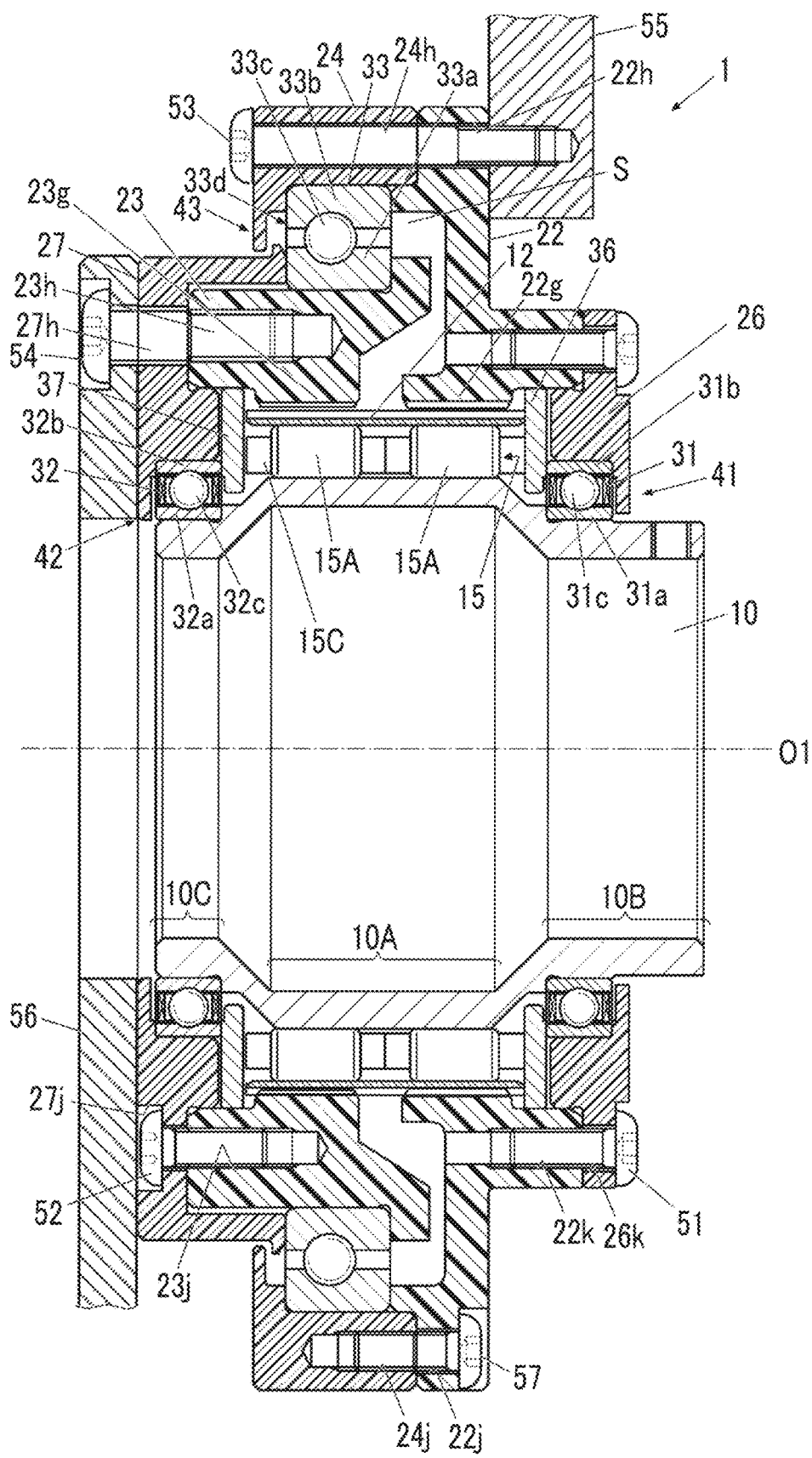
FIG. 1 is a cross-sectional view illustrating a gear device (1) according to one embodiment of the present invention.

Hereinafter, one embodiment of the present invention will be described in detail with reference to the drawings. FIG. 1 is a cross-sectional view illustrating a bending meshing type gear device as a gear device according to one embodiment of the present invention.

Hereinafter, a direction along a rotation axis O1 in the figure is defined as an "axial direction", a direction perpendicular to the rotation axis O1 is defined as a "radial direction", and a rotation direction around the rotation axis O1 is defined as a "circumferential direction".

As illustrated in FIG. 1, a bending meshing type gear device 1 is a cylindrical bending meshing type gear device in which an external gear 12 (second gear) is bendably deformed to transmit a rotary motion around the rotation axis O1.

Specifically, the bending meshing type gear device 1 includes a wave generator shaft 10, the external gear 12 that is bendably deformed by the wave generator shaft 10, a first internal gear 22g and a second internal gear 23g that mesh with the external gear 12, and a wave generator bearing 15. Further, the bending meshing type gear device 1 includes a first casing 22, an internal gear member 23, a second casing 24, a first cover 26, a second cover 27, input bearings 31 and 32, and a main bearing 33.

The wave generator shaft 10 has a hollow shaft shape, and includes a wave generator 10A in which the outer shape of a cross section perpendicular to the rotation axis O1 is an elliptical shape, and shaft portions 10B and 10C which are provided on both sides in the axial direction of the wave generator 10A, and in which the outer shape of a cross section perpendicular to the rotation axis O1 is a circular shape. The elliptical shape is not limited to a geometrically perfect ellipse, and includes a substantially elliptical shape. The wave generator shaft 10 rotates around the rotation axis O1, and the center of the outer shape of a cross section of the wave generator 10A coincides with the rotation axis O1, the cross section being perpendicular to the rotation axis O1. The wave generator shaft 10 is an input shaft which is connected to a drive source (not illustrated) such as a motor, and to which driving force is input.

The external gear 12 is a cylindrical metallic member having bendability, and teeth are provided on an outer periphery of the external gear 12.

The first internal gear 22g and the second internal gear 23g rotate around the rotation axis O1 on the periphery of the wave generator shaft 10.

The first internal gear 22g and the second internal gear 23g are provided side by side in the axial direction, and mesh with the external gear 12. Specifically, one of the first internal gear 22g and the second internal gear 23g meshes with a tooth portion of the external gear 12 on one side with respect to the center in the axial direction of the external gear 12, and the other meshes with a tooth portion of the external gear 12 on the other side with respect to the center in the axial direction of the external gear 12. Internal teeth are provided at the meshing location of an inner peripheral portion of the first casing 22 to form the first internal gear 22g. Internal teeth are provided at the meshing location of an inner peripheral portion of the internal gear member 23 to form the second internal gear 23g.

The wave generator bearing 15 is disposed between the wave generator 10A and the external gear 12. The wave generator bearing 15 includes a plurality of rolling elements (rollers) 15A, and a retainer 15C that retains the plurality of rolling elements 15A. The plurality of rolling elements 15A roll on an outer peripheral surface of the wave generator 10A and an inner peripheral surface of the external gear 12, which serve as rolling contact surfaces. The wave generator bearing 15 may include an inner ring separate from the wave generator 10A, and an outer ring separate from the external gear 12.

Spacer rings 36 and 37 are provided on both sides in the axial direction of the external gear 12 and the retainer 15C of the wave generator bearing 15, as restricting members that are in contact with the external gear 12 and the retainer 15C to restrict movement thereof in the axial direction.

The first casing 22 and the second casing 24 are connected to each other with a bolt 57 which is a connection member, and cover an outer side in the radial direction of the first internal gear 22g, the second internal gear 23g, and the external gear 12. As described above, the internal teeth are provided in a part of the inner peripheral portion of the first casing 22, and are integrally formed with the first internal gear 22g.

In addition, end portions on a counter load side (right side in FIG. 1) of the first casing 22 and the second casing 24 are provided with bolt connection holes 22h and 24h extending in a row in the axial direction. When the bending meshing type gear device 1 is connected to an external member 55 (for example, a base end side arm member of a robot) outside the device, the first casing 22 and the second casing 24 are connected to the external member 55 together with a bolt 53 which is a connection member via the bolt connection holes 22h and 24h. The bolt connection holes 22h and 24h are provided at a plurality of locations in the circumferential direction. In addition, the first casing 22 and the second casing 24 have bolt holes 22j and 24j separate from the bolt connection holes 22h and 24h, and are connected (temporarily fixed) to each other with the bolt 57 described above which is inserted into and screwed to the bolt holes 22j and 24j.

At least apart of the internal gear member 23 is disposed inside the second casing 24 in the radial direction and outside the wave generator shaft 10 in the radial direction. In addition, as described above, a part of the inner peripheral portion of the internal gear member 23 is provided with the internal teeth, and the internal gear member 23 is integrally formed with the second internal gear 23g.

The first cover 26 and the first casing 22 have bolt holes 26k and 22k on the counter load side, and are connected to each other with a bolt 51 inserted into and screwed to the bolt holes 26k and 22k.

Then, the first cover 26 covers an outer peripheral portion on one end side of the wave generator shaft 10.

The second cover 27 is connected to the internal gear member 23, and covers an outer peripheral portion on the other end side of the wave generator shaft 10. End portions on a load side (left side in FIG. 1) of the second cover 27 and the internal gear member 23 are provided with bolt connection holes 27h and 23h extending in a row in the axial direction. When the bending meshing type gear device 1 is connected to a driven member 56 (for example, a tip end side arm member of the robot) outside the device, the second cover 27 and the internal gear member 23 are connected to the driven member 56 together with a bolt 54 which is a connection member via the bolt connection holes 27h and 23h. The bolt connection holes 27h and 23h are provided at a plurality of locations in the circumferential direction. In addition, the second cover 27 and the internal gear member 23 have bolt holes 27j and 23j separate from the bolt connection holes 27h and 23h, and are connected (temporarily fixed) to each other with a bolt 52 inserted into and screwed to the bolt holes 27j and 23j.

The input bearing 31 is, for example, a ball bearing including an inner ring 31a, an outer ring 31b, and a rolling element 31c, and is disposed between a shaft portion 10B of the wave generator shaft 10 and the first cover 26. The first cover 26 rotatably supports the wave generator shaft 10 via the input bearing 31. The input bearing 31 is not limited to a ball bearing, and various bearings can be adopted, for example, a roller bearing may be adopted. In addition, the inner ring may be integrally formed with the wave generator shaft 10, or the outer ring may be integrally formed with the first cover 26 instead of a dedicated inner ring or outer ring being provided.

The input bearing 32 is, for example, a ball bearing including an inner ring 32a, an outer ring 32b, and a rolling element 32c, and is disposed between a shaft portion 10C of the wave generator shaft 10 and the second cover 27. The second cover 27 rotatably supports the wave generator shaft 10 via the input bearing 32. The input bearing 32 is not limited to a ball bearing, and various bearings can be adopted, for example, a roller bearing may be adopted. In addition, the inner ring may be integrally formed with the wave generator shaft 10, or the outer ring may be integrally formed with the second cover 27 instead of a dedicated inner ring or outer ring being provided.

In addition, both the input bearings 31 and 32 are bearings with seals in which a lubricant is sealed, but may not include seals.

The main bearing 33 is, for example, a ball bearing including an inner ring 33a, an outer ring 33b, and a rolling element 33c, and is disposed between the internal gear member 23 and the second casing 24. The second casing 24 rotatably supports the internal gear member 23 via the main bearing 33. The main bearing 33 is not limited to a ball bearing, and various bearings can be adopted. For example, the main bearing 33 may be a crossed roller bearing, and may include a plurality of bearings (angular ball bearings, tapered bearings, or the like) separated from each other in the axial direction between the internal gear member 23 and the second casing 24. In addition, the main bearing 33 may be configured such that the inner ring is integrally formed with the internal gear member 23 and the outer ring is integrally formed with the second casing 24 instead of a dedicated inner ring or outer ring being provided. In addition, the main bearing 33 is not particularly limited, and may be a bearing with a seal in which a lubricant is sealed.

Seal portions 41 to 43 which are shaft seal portions for ensuring sealing performance for the bearings are provided outside the input bearings 31 and 32 and the main bearing 33 in the axial direction with respect to a lubricant sealing space S in which mechanical parts of the bending meshing type gear device 1 are accommodated.

The seal portion 41 of the input bearing 31 is a wall surface that extends inward from the first cover 26 to a vicinity of an outer peripheral surface of the wave generator shaft 10 (shaft portion 10B) in the radial direction to cover an outer side in the axial direction of the input bearing 31, and forms a narrow gap between the seal portion 41 and an outer periphery of the shaft portion 10B to restrain movement of the lubricant.

The seal portion 42 of the input bearing 32 is a wall surface that extends inward from the second cover 27 to a vicinity of an outer peripheral surface of the wave generator shaft 10 (shaft portion 10C) in the radial direction to cover an outer side in the axial direction of the input bearing 32, and forms a narrow gap between the seal portion 42 and an outer periphery of the shaft portion 10C to restrain movement of the lubricant.

The seal portion 43 of the main bearing 33 is a wall surface that extends inward from the second casing 24 to a vicinity of an outer peripheral surface of the second cover 27 in the radial direction to cover an outer side in the axial direction of the main bearing 33, and forms a narrow gap between the seal portion 43 and an outer periphery of the second cover 27 to restrain movement of the lubricant. In addition, an inner side (main bearing 33 side) of the seal portion 43 is provided with a protrusion that protrudes outward from the second cover 27 in the radial direction. The seal portion 43 and the protrusion form a labyrinth structure.

Material of Each Member

In the present embodiment, the material of each member is configured as follows.

The wave generator shaft 10, the external gear 12, and the spacer rings 36 and 37 are made of a metallic material such as a steel material. More specifically, the wave generator shaft 10 is made of, but not particularly limited to, a steel material such as chromium molybdenum steel. The external gear 12 is made of a steel material such as nickel chrome molybdenum steel. The spacer rings 36 and 37 are made of a steel material such as a high carbon chrome bearing steel material.

In addition, in the input bearings 31 and 32 and the main bearing 33, the inner and outer rings and the rolling elements are made of a metal, for example, a high carbon chrome bearing steel material.

In addition, in the wave generator bearing 15, the rolling element 15A and the retainer 15C are made of a metal, for example, a high carbon chrome bearing steel material.

In addition, for example, each of the bolts 51 to 54 and 57 is made of a metal such as a rolled steel for general structural use, a carbon steel wire for cold heading and cold forging, or a carbon steel for machine structural use.

The bending meshing type gear device 1 includes a "first gear"; a "second gear" meshing with the "first gear"; a "connection member" connected to an "external member"; a "path member" disposed in a (heat transfer) path leading to the "first gear" and the "connection member"; and "other members" that are members other than the "first gear", the "second gear", the "connection member", and the "path member", and are made of a resin, and the "first gear", the "connection member", and the "path member" are made of a resin having a higher thermal conductivity than that of the "other members", which is one characteristic.

In addition, the bending meshing type gear device 1 includes an "output member" corresponding to the "other members" connected to a "driven member", the "output member" is disposed between any member of the "first gear", the "connection member", and the "path member" and the "driven member", and the "driven member" is connected to any member of the "first gear", the "connection member", and the "path member" with a bolt made of metal and penetrating through the "output member", which is another characteristic.

In the bending meshing type gear device 1, the first internal gear 22g and the second internal gear 23g correspond to the "first gear", and the external gear 12 corresponds to the "second gear" meshing with the "first gear".

The external member 55 corresponds to the "external member", and the first casing 22 corresponds to the "connection member" connected to the "external member".

When the first internal gear 22g is the "first gear", the first casing 22 corresponds to the "path member" disposed in the path leading to the "first gear" and the "connection member".

Namely, regarding a heat transfer path of the first internal gear 22g, a portion (outer portion in the radial direction of the first casing 22) of the first casing 22, which is connected to the external member 55, is the "connection member", and a portion of the first casing 22 from a portion around the first internal gear 22g to a vicinity of the portion connected to the external member 55 is the "path member". Namely, regarding the heat transfer path of the first internal gear 22g, the "first gear", the "path member", and the "connection member" are integrally formed.

When the second internal gear 23g is the "first gear", the internal gear member 23 corresponds to the "path member" disposed in the path leading to the "first gear" and the "connection member".

Namely, regarding a heat transfer path of the second internal gear 23g, the first casing 22 is the "connection member", and a portion of the internal gear member 23 other than the second internal gear 23g is the "path member". Namely, regarding the heat transfer path of the second internal gear 23g, the "first gear" and the "path member" are integrally formed.

In the case of the heat transfer path of the second internal gear 23g, the main bearing 33 made of a metal is provided between the internal gear member 23 as the "path member" and the first casing 22 as the "connection member", and the main bearing 33 forms a part of the heat transfer path. More specifically, the inner ring 33a of the main bearing 33 is in contact with the internal gear member 23 in the radial direction and the axial direction, and the outer ring 33b of the main bearing 33 is in contact with the first casing 22 in the axial direction, to form the heat transfer path.

The second casing 24, the first cover 26, and the second cover 27 correspond to the "other members" that are members other than the "first gear", the "second gear", the "connection member", and the "path member", and are made of a resin.

Namely, the "other members" are members excluding a member corresponding to any one of the "first gear", the "second gear", the "connection member", and the "path member" described above, and excluding members made of a metal such as the wave generator shaft 10, the external gear 12, the spacer rings 36 and 37, the input bearings 31 and 32, the main bearing 33, the wave generator bearing 15, and each of the bolts 51 to 54 and 57 described above.

Then, in the bending meshing type gear device 1, the second casing 24, the first cover 26, and the second cover 27 which correspond to the "other members" are made of a resin, and the first internal gear 22g, the second internal gear 23g, the first casing 22, and the internal gear member 23 which correspond to the "first gear", the "connection member", and the "path member" are made of a resin having a higher thermal conductivity than that of each of the members corresponding to the "other members".

In the following description, the members such as the "first gear", the "connection member", and the "path member" made of a resin having a higher thermal conductivity than that of the "other members" are collectively referred to as "high thermal conductive resin members", and the members made of a resin having low thermal conductivity and corresponding to the "other members" are collectively referred to as "low thermal conductive resin members".

In FIG. 1, the members are illustrated to be easily identifiable by applying identical hatching to the members corresponding to the "low thermal conductive resin members", and applying another identical hatching to the members corresponding to the "high thermal conductive resin members". The same applies to FIG. 2 to be described later.

For all the members corresponding to the "low thermal conductive resin members", a plurality of types of resins may be used instead of using the same resin. Similarly, for all the members corresponding to the "high thermal conductive resin members", a plurality of types of resins may be used instead of using the same resin.

Meanwhile, all types of resins used for the "high thermal conductive resin members" have a higher thermal conductivity than all types of resins used for the "low thermal conductive resin members".

As the resin used for the "low thermal conductive resin members", in the present embodiment, a resin containing a reinforcing fiber in the base material of the resin is used. However, a resin which does not contain a reinforcing fiber may be used.

As the resin of the base material, for example, engineering plastics (general-purpose engineering plastics) having a heat resistance of approximately 50 to 60° C. are used. Specifically, examples of the resin of the base material include polyamide (PA), polycarbonate (PC), polyacetal (POM), modified polyphenylene ether (m-PPE), polybutylene terephthalate (PBT), and the like. The heat resistance referred to here is not a temperature at which the shape can be statically maintained but a temperature at which the performance as a gear can be maintained, and the same applies to the high thermal conductive resin members.

In addition, examples of the reinforcing fiber include a glass fiber, an aramid fiber, a polyethylene fiber, a Zylon fiber, a boron fiber, and the like. In the case of general-purpose engineering plastics containing the above fibers (for example, polyacetal containing a glass fiber), the thermal conductivity is less than 0.3 W/m° C.

As the resin used for the "high thermal conductive resin members", in the present embodiment, a resin containing a reinforcing fiber in the base material of the resin is used. However, a resin which does not contain a reinforcing fiber may be used.

It is preferable that the resin of the base material is a resin having a heat resistance of 70° C. or higher, and, for example, super engineering plastics having a heat resistance of 100° C. or higher (special engineering plastics) are used. Specifically, examples of the resin include polyetheretherketone (PEEK), polyamideimide (PAI), polyphenylene sulfide (PPS), polytetrafluoroethylene (PTFE), aromaticpolyamide (PPA), liquid crystalpolymer (LCP), polysulfone (PSU), polyethersulfone (PES), polyetherimide (PEI), polyarylate (PAR), thermoplasticpolyimide (TPI), and the like.

In addition, the reinforcing fiber may be a fiber having a higher thermal conductivity than that of the reinforcing fiber of the "low thermal conductive resin members", and examples of the reinforcing fiber include a carbon fiber and the like. It is preferable that the thermal conductivity of the high thermal conductive resin members is 0.5 W/m° C. or more, and in the case of a resin in which a carbon fiber is contained in a super engineering plastic (for example, polyetheretherketone), the thermal conductivity is 0.95 W/m° C.

In addition, in the bending meshing type gear device 1, the driven member 56 corresponds to the "driven member", and the second cover 27 corresponds to the "output member" connected to the "driven member". The second cover 27 is disposed between the internal gear member 23 as the "path member" and the driven member 56.

Then, the driven member 56 is connected to the internal gear member 23, which is the "path member", with the bolt 54 made of metal and penetrating through the second cover 27 as the "output member".

Description of Operation

In the bending meshing type gear device 1 with the above configuration, when the wave generator shaft 10 is driven to rotate by the drive source such as a motor, a motion of the wave generator 10A is transmitted to the external gear 12. At this time, the external gear 12 is restricted by a shape along the outer peripheral surface of the wave generator 10A, and when viewed in the axial direction, is bent in an elliptical shape including a major axis portion and a minor axis portion. Further, the major axis portion of the external gear 12 meshes with the first internal gear 22g that is fixed. For this reason, the external gear 12 does not rotate at the same rotating speed as that of the wave generator 10A, and the wave generator 10A rotates relative to the external gear 12 thereinside. Then, the external gear 12 is bendably deformed with the relative rotation such that a major axis position and a minor axis position move in the circumferential direction. The period of the deformation is proportional to the rotation period of the wave generator shaft 10.

When the external gear 12 is bendably deformed, the major axis position of the external gear 12 moves, so that the position of meshing between the external gear 12 and the first internal gear 22g is changed in the rotation direction. Here, for example, when it is assumed that the number of teeth of the external gear 12 is 100 and the number of teeth of the first internal gear 22g is 102, whenever the position of meshing makes one revolution, the meshing teeth of the external gear 12 and the first internal gear 22g are shifted. For example, when the external member 55 is fixed, since the first internal gear 22g is fixed, the external gear 12 rotates. When the numbers of teeth are as described above, a rotary motion of the wave generator shaft 10 is reduced at a reduction ratio of 100:2 to be transmitted to the external gear 12.

Meanwhile, since the external gear 12 also meshes with the second internal gear 23g, the position of meshing between the external gear 12 and the second internal gear 23g is also changed in the rotation direction by the rotation of the wave generator shaft 10. Here, when the number of teeth of the second internal gear 23g and the number of teeth of the external gear 12 are set to the same value, the external gear 12 and the second internal gear 23g do not rotate relative to each other, and a rotary motion of the external gear 12 is transmitted to the second internal gear 23g at a reduction ratio of 1:1. Therefore, the rotary motion of the wave generator shaft 10 is reduced at a reduction ratio of 100:2 to be transmitted to the internal gear member 23 and the second cover 27, and the rotary motion is output to the driven member 56.

During this operation, the first internal gear 22g and the second internal gear 23g each mesh with the external gear 12 to generate heat due to friction.

A part of the heat generated in the meshing portions is transferred to the external gear 12, the wave generator bearing 15, and the wave generator shaft 10, which are made of a metal having a high thermal conductivity, and is dissipated.

Further, the heat generated in the first internal gear 22g is transferred to the external member 55 through the first casing 22 and is dissipated.

In addition, the heat generated in the second internal gear 23g is transferred to the internal gear member 23, and is further transferred from the first casing 22 to the external member 55 via the main bearing 33 and is dissipated.

In addition, the heat generated in the second internal gear 23g is also transferred to the driven member 56 through the bolt 54 and is dissipated.

Technical Effects of Present Embodiment

In the bending meshing type gear device 1, the second casing 24, the first cover 26, and the second cover 27 which correspond to the "other members", and the first internal gear 22g, the second internal gear 23g, the first casing 22, and the internal gear member 23 which correspond to the "first gear", the "connection member", and the "path member" are made of a resin.

For this reason, the number of the members made of a metal in the bending meshing type gear device 1 can be reduced, so that weight reduction can be realized.

In addition, in the bending meshing type gear device 1, since the external gear 12 (the wave generator bearing 15 and the wave generator shaft 10) is made of metal, heat generated in the meshing portions can be dissipated via the member made of metal.

Further, in the bending meshing type gear device 1, since each of the members serving as the high thermal conductive resin members which form a heat transfer path from the first internal gear 22g and the second internal gear 23g to the external member 55 or the driven member 56 is made of a resin material, heat dissipation to the external member 55 can be efficiently performed, so that a rise in temperature of the device can be effectively suppressed.

Further, in the bending meshing type gear device 1, not all the resin members are made of a high thermal conductive resin, and the low thermal conductive resin members are used as the other members which do not form the heat transfer path.

In general, the base material of the resin used for the low thermal conductive resin members is an inexpensive resin as represented by general-purpose engineering plastics, and the base material of the resin used for the high thermal conductive resin members is an expensive resin having a special function or properties as represented by super engineering plastics. In addition, the fiber (for example, a glass fiber) which has a low thermal conductivity and is contained in the low thermal conductive resin members is less expensive than the fiber (for example, a carbon fiber) which has a high thermal conductivity and is contained in the high thermal conductive resin members.

Therefore, as described above, a resin having a high thermal conductivity is used only for the members forming the heat transfer path from heat generation locations to the external member 55, which can dissipate heat, in the bending meshing type gear device 1, so that the production cost can be reduced while the weight reduction of the bending meshing type gear device 1 is achieved.

In addition, as the fiber contained in the resin that is the base material of the high thermal conductive resin members, a fiber having a higher thermal conductivity than that of the low thermal conductive resin members is used.

For this reason, the high thermal conductive resin members can efficiently perform heat transfer and effectively perform heat dissipation while maintaining a high member strength and realizing weight reduction.

In addition, as the base material of the resin used for the high thermal conductive resin members, a resin having higher heat resistance than that of the base material of the resin used for the low thermal conductive resin members is used. For this reason, even when the first internal gear 22g and the second internal gear 23g generate heat during operation of the bending meshing type gear device 1, due to high heat resistance, abrasion, degradation, or deformation can be suppressed, and the accuracy of operation can be also maintained.

In addition, degradation or deformation of each of the members which perform heat transfer can be also suppressed due to high heat resistance.

In addition, in the bending meshing type gear device 1, the first internal gear 22g and the second internal gear 23g are the first gear, and the external gear 12 is the second gear.

When the internal gear and the external gear mesh with each other, the overall size of the internal gear located on an outer side is large, and accordingly, the volume of the member is also large. For this reason, the first internal gear 22g and the second internal gear 23g are the first gear, and are made of a resin, so that effective weight reduction can be realized.

In addition, in the bending meshing type gear device 1, since the main bearing 33 made of a metal is disposed between the internal gear member 23 and the first casing 22 which form the heat transfer path, thermal conduction can be efficiently performed, and heat dissipation can be efficiently performed through the main bearing 33.

In addition, since the first casing 22 as the connection member and the external member 55 are connected to each other with the bolt 53 made of metal, heat transfer can be efficiently performed, and heat dissipation can be efficiently performed not only through contact surfaces of the members but also through the bolt 53.

In addition, the bending meshing type gear device 1 includes the second cover 27 as the output member connected to the driven member 56, and the driven member 56 is connected to the internal gear member 23 with the bolt 54 made of metal and penetrating through the second cover 27.

For this reason, even when the second cover 27 which is the low thermal conductive resin member intervenes in the middle of the heat transfer path, the heat transfer path from the second internal gear 23g to the driven member 56 can be secured by the bolt 54, and heat dissipation can be efficiently performed.

Another Embodiment

Figure 2:
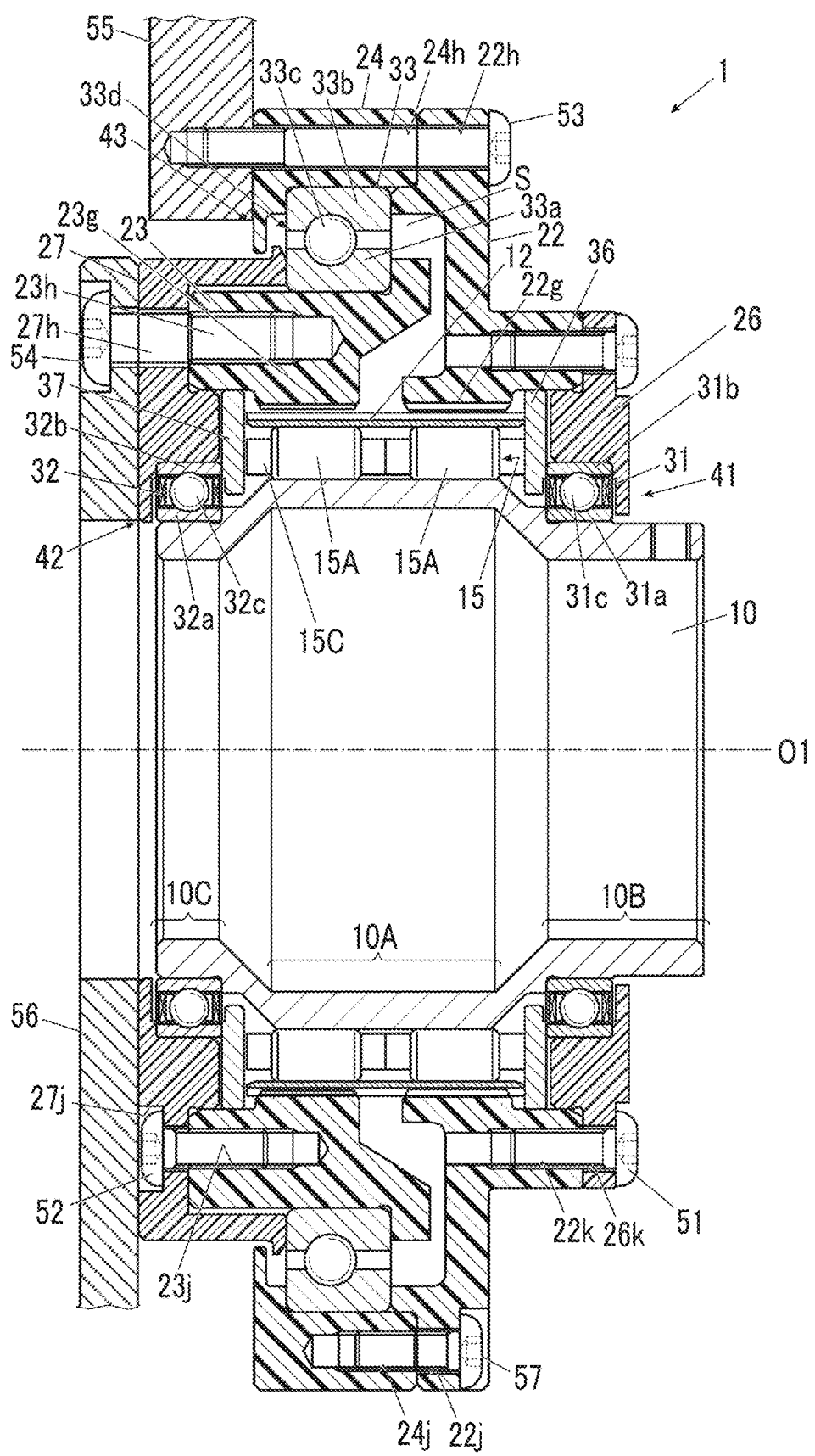
FIG. 2 is a cross-sectional view illustrating a gear device (1) according to another embodiment of the present invention.

Hereinafter, another embodiment of the present invention will be described in detail with reference to the drawings. FIG. 2 is a cross-sectional view illustrating the bending meshing type gear device 1 according to another embodiment of the present invention.

Since the majority of a configuration of the bending meshing type gear device 1 of another embodiment is the same as that of the bending meshing type gear device 1 of one embodiment, only the differences will be mainly described.

In one embodiment, the configuration of the bending meshing type gear device 1 in which in a state where the external member 55 is in direct contact with the first casing 22, the first casing 22 and the second casing 24 are connected to the external member 55 together with the bolt 53 has been illustrated.

Meanwhile, in another embodiment, the configuration of the bending meshing type gear device 1 in which in a state where the external member 55 is indirect contact with the second casing 24, the first casing 22 and the second casing 24 are connected to the external member 55 together with the bolt 53 will be illustrated.

In addition, accordingly, in one embodiment, the second casing 24 corresponds to the "other members" (low thermal conductive resin member); however, in another embodiment, the second casing 24 corresponds to the "connection member" which forms the heat transfer path of the first internal gear 22g and the second internal gear 23g, and is made of a resin as the high thermal conductive resin member. The base material of the resin as the high thermal conductive resin member and the contained fiber are as illustrated in one embodiment.

In the bending meshing type gear device 1 of another embodiment, when the first internal gear 22g is the "first gear", the first casing 22 as the "path member" and the second casing 24 as the "connection member" form the heat transfer path, and heat is dissipated from the external member 55.

In addition, when the second internal gear 23g is the "first gear", the internal gear member 23 as the "path member" and the second casing 24 as the "connection member" form the heat transfer path. In addition, heat transfer is performed between the internal gear member 23 and the second casing 24 via the main bearing 33. Then, accordingly, heat is dissipated from the external member 55.

As described above, when the connection member to be connected to the external member 55 is changed, the members corresponding to the high thermal conductive resin members are changed, and also in the case of the bending meshing type gear device 1 of another embodiment, the same technical effects as those of the bending meshing type gear device 1 of one embodiment can be obtained.

Others

The embodiments of the present invention have been described above, but the present invention is not limited to each of the embodiments.

For example, in the bending meshing type gear device 1 described above, the member corresponding to the "first gear" and the member corresponding to the "path member" may be integrally formed, or may be individually separated members. The same applies to the member corresponding to the "path member" and the member corresponding to the "connection member".

In addition, in each of the embodiments, the case where each of the first internal gear 22g and the second internal gear 23g is the "first gear", and the heat transfer path is formed for each has been illustrated; however, only one of the first internal gear 22g and the second internal gear 23g may be the "first gear", and the heat transfer path may be formed only for the one gear.

In addition, the external gear 12 may be the "first gear", and the heat transfer path may be formed for the external gear 12. In that case, it is preferable that the external gear 12 is configured to transfer heat to the "path member" via a bearing made of a metal (for example, the wave generator bearing 15).

In addition, some or all of the wave generator shaft 10, the external gear 12, the spacer rings 36 and 37, the input bearings 31 and 32, the main bearing 33, the wave generator bearing 15, and each of the bolts 51 to 54 and 57, which have been illustrated as the members made of a metal, may be made of a resin. In that case, it is preferable that the members in the heat transfer path are made of the base materials of the resins and the fibers illustrated in one embodiment as the high thermal conductive resin members.

In addition, in each of the embodiments, the configuration in which the driven member 56 is connected to the internal gear member 23 as the path member with the bolt 54 made of metal has been illustrated; however, the present invention is not limited to this configuration, and the driven member 56 may be configured to be connected to the member corresponding to the "first gear" or the "connection member" with the bolt.

In addition, in each of the embodiments, a so-called cylindrical bending meshing type gear device has been illustrated as the bending meshing type gear device 1. However, the present invention is not limited thereto, and is also applicable to, for example, a so-called cup type or silk hat type bending meshing type gear device.

In addition, the present invention is not limited to the bending meshing type gear device, and is applicable to various gear devices. For example, the present invention is also applicable to a gear device constituting a center crank type or a sorting type eccentric oscillating reduction gear, or to a simple planetary gear, and is also applicable to a parallel shaft gear device, an orthogonal gear device, and the like.

In addition, changes can be made to the detailed parts illustrated in the embodiments without departing from the concept of the invention.

It should be understood that the invention is not limited to the above-described embodiment, but may be modified into various forms on the basis of the spirit of the invention. Additionally, the modifications are included in the scope of the invention.

What is claimed is:

1. A gear device comprising:
a first gear; and
a second gear meshing with the first gear,
wherein at least the first gear is made of a resin,
the gear device further comprises a connection member connected to an external member, a path member disposed in a path leading to the first gear and the connection member, and other members that are members other than the first gear, the second gear, the connection member, and the path member, and are made of a resin, and
the first gear, the connection member, and the path member are made of a resin having a higher thermal conductivity than a thermal conductivity of the other members.

2. The gear device according to claim 1,
wherein the first gear is an internal gear, and
the second gear is an external gear.

3. The gear device according to claim 2,
wherein the first gear includes a first internal gear and a second internal gear that are provided side by side in an axial direction, and
one of the first internal gear and the second internal gear meshes with a tooth portion of the second gear on one side with respect to a center in the axial direction of the second gear, and the other meshes with a tooth portion of the second gear on the other side with respect to the center in the axial direction of the second gear.

4. The gear device according to claim 1,
wherein a fiber contained in the resin of the first gear, the connection member, and the path member has a higher thermal conductivity than a thermal conductivity of a fiber contained in the resin of the other members.

5. The gear device according to claim 1,
wherein a base material of the resin of the first gear, the connection member, and the path member has higher heat resistance than heat resistance of a base material of the resin of the other members.

6. The gear device according to claim 1,
wherein a bearing made of a metal is disposed between two members among the first gear, the connection member, and the path member.

7. The gear device according to claim 1,
wherein the connection member and the external member are connected to each other with a bolt made of a metal.

8. The gear device according to claim 1,
wherein an output member connected to a driven member corresponds to the other members,
the output member is disposed between any member of the first gear, the connection member, and the path member and the driven member, and
the driven member is connected to any member of the first gear, the connection member, and the path member with a bolt made of a metal and penetrating through the output member.

9. The gear device according to claim 1, further comprising:
a wave generator shaft having a hollow shaft shape, and including a wave generator in which an outer shape of a cross section perpendicular to a rotation axis is a substantially elliptical shape, and shaft portions which are provided on both sides in an axial direction of the wave generator, and in which an outer shape of a cross section perpendicular to the rotation axis is a substantially circular shape; and
a wave generator bearing disposed between the wave generator and the second gear.

10. The gear device according to claim 9,
wherein the wave generator shaft rotates around the rotation axis, and
a center of the outer shape of the cross section of the wave generator perpendicular to the rotation axis coincides with the rotation axis.

11. The gear device according to claim 10,
wherein the wave generator shaft is an input shaft which is connected to a drive source and to which driving force is input.

12. The gear device according to claim 10,
wherein the wave generator bearing includes a plurality of rolling elements, and a retainer that retains the plurality of rolling elements, and
the plurality of rolling elements roll on an outer peripheral surface of the wave generator and an inner peripheral surface of the second gear, which serve as rolling contact surfaces.

13. The gear device according to claim 12,
wherein restricting members that are in contact with the second gear and the retainer to restrict movement thereof in an axial direction are provided on both sides in the axial direction of the second gear and the retainer.

14. The gear device according to claim 10,
wherein the other members are covers that cover outer peripheral portions on both end sides of the wave generator shaft, an input bearing is disposed between the shaft portion and the cover, and
the cover rotatably supports the wave generator shaft via the input bearing.

15. The gear device according to claim 14,
wherein the input bearing is a ball bearing including an inner ring, an outer ring, and a rolling element.

16. The gear device according to claim 14, further comprising:
a seal portion that seals the input bearing,
wherein the seal portion is a wall surface that extends inward from the cover to a vicinity of an outer peripheral surface of the wave generator shaft in a radial direction to cover an outer side in an axial direction of the input bearing, and forms a gap between the seal portion and an outer periphery of the shaft portion.

17. The gear device according to claim 1,
wherein the second gear is a cylindrical metallic member having bendability.

18. The gear device according to claim 1,
wherein the other members are made of a resin having a thermal conductivity of approximately less than 0.3 W/m° C., and
the first gear, the connection member, and the path member are made of a resin having a thermal conductivity of approximately 0.5 W/m° C. or more.

19. The gear device according to claim 1,
wherein the other members are made of a resin having a heat resistance of approximately 50 to 60° C., and
the first gear, the connection member, and the path member are made of a resin having a heat resistance of approximately 70° C. or higher.

* * * * *